United States Patent
Zhu et al.

(10) Patent No.: US 9,509,231 B2
(45) Date of Patent: Nov. 29, 2016

(54) POWER CONVERTER SYSTEM, DAMPING SYSTEM, AND METHOD OF OPERATING A POWER CONVERTER SYSTEM

(75) Inventors: Huibin Zhu, Westford, MA (US); David Smith, Daleville, VA (US); David Scott Wilmer, Roanoke, VA (US); Maozhong Gong, Colonie, NY (US); Jun Zhu, Shanghai (CN); Xueqin Wu, Shanghai (CN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 73 days.

(21) Appl. No.: 14/396,917

(22) PCT Filed: Apr. 26, 2012

(86) PCT No.: PCT/CN2012/074731
§ 371 (c)(1),
(2), (4) Date: Oct. 24, 2014

(87) PCT Pub. No.: WO2013/159306
PCT Pub. Date: Oct. 31, 2013

(65) Prior Publication Data
US 2015/0103573 A1    Apr. 16, 2015

(51) Int. Cl.
*H02M 7/537* (2006.01)
*H02M 1/36* (2007.01)
(Continued)

(52) U.S. Cl.
CPC .............. *H02M 7/537* (2013.01); *H02M 1/32* (2013.01); *H02M 1/36* (2013.01); *H02M 5/4585* (2013.01); *H02M 2001/322* (2013.01)

(58) Field of Classification Search
CPC .............. H02H 9/001; H02H 7/1222; H02M 3/33584; H02M 3/33592

USPC ....... 361/56, 58, 84, 90, 110, 106, 111, 187; 363/16–17, 37, 49, 53, 56.02, 71, 89, 363/98
See application file for complete search history.

(56) References Cited

U.S. PATENT DOCUMENTS 3,353,080 A * 11/1967 Santelmann, Jr. ...... H02M 7/04
323/268
5,831,846 A    11/1998 Jiang
(Continued)

FOREIGN PATENT DOCUMENTS

CN    102163851 A    8/2011
CN    102223094 A    10/2011
(Continued)

OTHER PUBLICATIONS

PCT Search Report and Written Opinion issued in connection with corresponding PCT Application No. PCT/CN2012/074731 on Jan. 31, 2013.
(Continued)

*Primary Examiner* — Rajnikant Patel
(74) *Attorney, Agent, or Firm* — Peter T. DiMauro; Armstrong Teasdale LLP (57) ABSTRACT

A power converter system includes a converter configured to be coupled to a power generation unit for receiving current from the power generation unit. A bus is coupled to the converter, and energy is stored within the bus when the current is conducted through the power converter system. A damping circuit is configured to be coupled to the bus and to the power generation unit, and a control system is coupled to the converter and to the damping circuit. The control system is configured to selectively discharge at least a portion of the energy stored within the bus through the damping circuit when the control system determines that a predetermined condition is met.

20 Claims, 3 Drawing Sheets

(51) Int. Cl.
*H02M 5/458* (2006.01)
*H02M 1/32* (2007.01)

(56) References Cited

U.S. PATENT DOCUMENTS

| | | | |
|---|---|---|---|
| 5,883,795 A | 3/1999 | Farrington | |
| 5,907,192 A | 5/1999 | Lyons et al. | |
| 5,929,537 A | 7/1999 | Glennon | |
| 6,339,309 B1 | 1/2002 | Bixel et al. | |
| 6,377,476 B1 | 4/2002 | Fraidlin et al. | |
| 6,388,902 B1* | 5/2002 | Yasumura | H02M 3/3385 363/21.02 |
| 6,646,842 B2* | 11/2003 | Pan | H02H 9/001 323/222 |
| 6,768,621 B2 | 7/2004 | Arnet et al. | |
| 6,882,548 B1 | 4/2005 | Jacobs et al. | |
| 6,898,093 B2 | 5/2005 | Ambo et al. | |
| 6,944,036 B2 | 9/2005 | Yan et al. | |
| 7,012,817 B2 | 3/2006 | Liu et al. | |
| 7,068,010 B2* | 6/2006 | Youm | H02M 7/5387 318/434 |
| 7,251,146 B2 | 7/2007 | Aso | |
| 7,518,348 B1 | 4/2009 | Kobayashi | |
| 7,566,828 B2* | 7/2009 | Sasaki | H02J 7/35 136/243 |
| 7,619,200 B1 | 11/2009 | Seymour et al. | |
| 7,729,139 B2 | 6/2010 | Chan et al. | |
| 7,804,293 B2* | 9/2010 | Hashimoto | G01R 31/31721 324/750.3 |
| 7,974,059 B2* | 7/2011 | Chishima | H02H 3/087 361/93.1 |
| 8,035,938 B2* | 10/2011 | Divan | H02H 3/025 361/106 |
| 8,050,062 B2 | 11/2011 | Wagoner et al. | |
| 8,106,537 B2* | 1/2012 | Casey | H01L 31/02021 307/82 |
| 2000/4062059 | 4/2004 | Cheng et al. | |
| 2004/0062059 A1 | 4/2004 | Cheng et al. | |
| 2007/0210651 A1 | 9/2007 | Ichinose et al. | |
| 2008/0013351 A1 | 1/2008 | Alexander | |
| 2008/0215200 A1 | 9/2008 | Toth | |
| 2009/0019299 A1 | 1/2009 | Deng et al. | |
| 2009/0278352 A1 | 11/2009 | Rivas et al. | |
| 2009/0316453 A1 | 12/2009 | Manabe et al. | |
| 2010/0020576 A1 | 1/2010 | Falk | |
| 2010/0079093 A1 | 4/2010 | Kitanaka et al. | |
| 2010/0097031 A1 | 4/2010 | King et al. | |
| 2011/0031939 A1 | 2/2011 | Funaba et al. | |
| 2011/0084674 A1 | 4/2011 | Cadoux | |
| 2011/0084704 A1 | 4/2011 | Myoen et al. | |
| 2011/0090726 A1 | 4/2011 | Brotto et al. | |
| 2011/0093148 A1 | 4/2011 | Kuehner et al. | |
| 2011/0205773 A1* | 8/2011 | Wagoner | H02J 3/383 363/132 |
| 2012/0019178 A1 | 1/2012 | Kono et al. | |
| 2012/0051102 A1 | 3/2012 | Wagoner et al. | |

FOREIGN PATENT DOCUMENTS

| | | |
|---|---|---|
| DE | 102008010980 A1 | 8/2009 |
| EP | 2395651 A2 | 12/2011 |
| WO | 2012045602 A2 | 4/2012 |

OTHER PUBLICATIONS

European Search Report and Opinion issued in connection with corresponding EP Application No. 12875683.0 on Apr. 8, 2016.

* cited by examiner

POWER CONVERTER SYSTEM, DAMPING SYSTEM, AND METHOD OF OPERATING A POWER CONVERTER SYSTEM

BACKGROUND OF THE INVENTION

The subject matter described herein relates generally to power systems and, more particularly, to a power converter system, a damping system, and a method of operating the power converter system.

In some known solar power systems, a plurality of photovoltaic panels (also known as solar panels) are logically or physically grouped together to form an array of solar panels. The solar panel array converts solar energy into electrical energy and transmits the energy to an electrical grid or other destination.

Solar panels generally output direct current (DC) electrical power. To properly couple such solar panels to an electrical grid, the electrical power received from the solar panels must be converted to alternating current (AC). At least some known power systems use a power converter to convert DC power to AC power. In certain situations, such as during a fault in the electrical grid, less than all of the available energy within the power converter may be delivered to the grid and a voltage amplitude within the power converter may increase to a level exceeding a rated voltage level of the converter. Accordingly, the power converter may be damaged and/or an operational lifetime of the power converter may be reduced.

BRIEF DESCRIPTION OF THE INVENTION

In one embodiment, a power converter system is provided that includes a converter configured to be coupled to a power generation unit for receiving current from the power generation unit. A bus is coupled to the converter, and energy is stored within the bus when the current is conducted through the power converter system. A damping circuit is configured to be coupled to the bus and to the power generation unit, and a control system is coupled to the converter and to the damping circuit. The control system is configured to selectively discharge at least a portion of the energy stored within the bus through the damping circuit when the control system determines that a predetermined condition is met.

In another embodiment, a damping system is provided for a power converter system including a converter and a bus coupled to the converter for storing energy. The damping system includes a damping element configured to be coupled to the bus and a protection device configured to be coupled to the damping element. The damping system also includes a damping controller configured to be coupled to the protection device and configured to selectively discharge energy stored within the bus through the damping element when a predetermined condition is met.

In yet another embodiment, a method of operating a power converter system including a converter and a bus coupled to the converter is provided. The method includes receiving current from a power generation unit, storing energy within the bus based on the current received, and supplying at least a portion of the received current to an electrical distribution network. The method also includes monitoring at least one of a voltage across the bus and a status of the electrical distribution network, determining whether a predetermined condition is met based on the at least one of the voltage across the bus and the status of the electrical distribution network, and discharging at least a portion of the energy stored within the bus using a damping circuit coupled to the bus when the predetermined condition is determined to be met.

DETAILED DESCRIPTION OF THE INVENTION

As described herein, a power generation system includes a power converter and at least one power generation unit, such as a solar array. The power converter includes a boost converter coupled to the solar array, and an inverter coupled to the boost converter by a DC bus. The inverter is coupled to an electrical distribution network for supplying electrical energy to the network. The power generation system also includes a damping system including a damping circuit and a damping controller. The damping circuit is coupled to the DC bus to selectively dissipate energy stored in the DC bus, and the damping controller controls the operation of the damping circuit. If a predetermined condition is met, such as if a voltage across the DC bus exceeds a predetermined threshold (also referred to as an "overvoltage event") or is expected to exceed the predetermined threshold, the damping controller controls the damping circuit to dissipate at least a portion of the energy stored in the DC bus. Specifically, the damping controller disconnects the solar array from the power converter and enables current to flow from the DC bus through a damping element such that energy is dissipated by the damping element. Accordingly, the damping system and the method described herein facilitate preventing overvoltage events from occurring and/or persisting within the DC bus, thus protecting the components of the boost converter.

Figure 1:
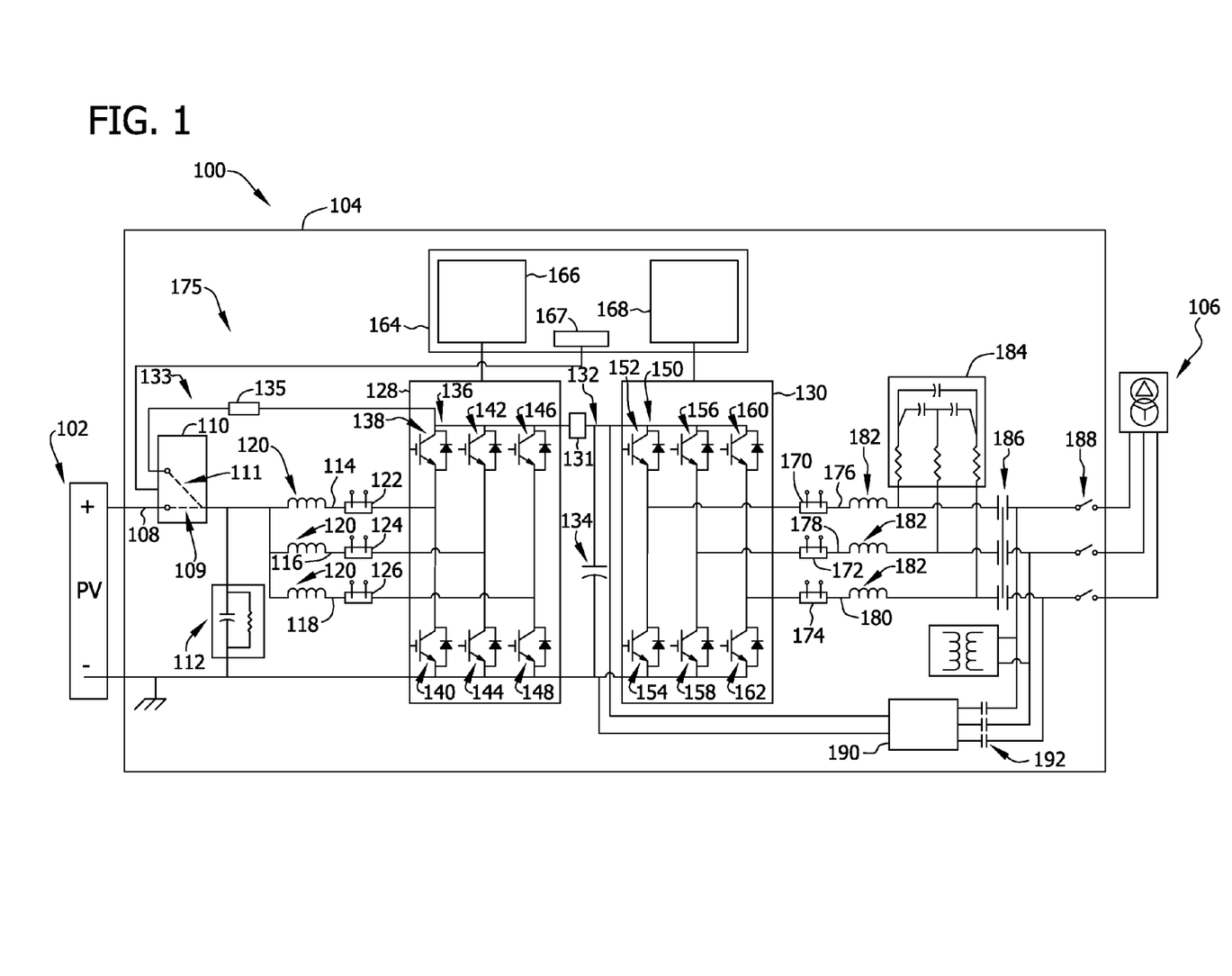
FIG. 1 is a schematic diagram of an exemplary power generation system.

FIG. 1 is a schematic diagram of an exemplary power generation system 100 that includes a plurality of power generation units, such as a plurality of solar panels (not shown) that form at least one solar array 102. Alternatively, power generation system 100 includes any suitable number and type of power generation units, such as a plurality of wind turbines, fuel cells, geothermal generators, hydropower generators, and/or other devices that generate power from renewable and/or non-renewable energy sources.

In the exemplary embodiment, power generation system 100 and/or solar array 102 includes any number of solar panels to facilitate operating power generation system 100 at a desired power output. In one embodiment, power generation system 100 includes a plurality of solar panels and/or solar arrays 102 coupled together in a series-parallel configuration to facilitate generating a desired current and/or voltage output from power generation system 100. Solar panels include, in one embodiment, one or more of a photovoltaic panel, a solar thermal collector, or any other device that converts solar energy to electrical energy. In the exemplary embodiment, each solar panel is a photovoltaic panel that generates a substantially direct current (DC) power as a result of solar energy striking solar panels.

In the exemplary embodiment, solar array 102 is coupled to a power converter 104, or a power converter system 104, that converts the DC power to alternating current (AC) power. The AC power is transmitted to an electrical distribution network 106, or "grid." Power converter 104, in the exemplary embodiment, adjusts an amplitude of the voltage and/or current of the converted AC power to an amplitude suitable for electrical distribution network 106, and provides AC power at a frequency and a phase that are substantially equal to the frequency and phase of electrical distribution network 106. Moreover, in the exemplary embodiment, power converter 104 provides three phase AC power to electrical distribution network 106. Alternatively, power converter 104 provides single phase AC power or any other number of phases of AC power to electrical distribution network 106.

DC power generated by solar array 102, in the exemplary embodiment, is transmitted through a converter conductor 108 coupled to power converter 104. In the exemplary embodiment, a protection device 110 electrically connects solar array 102 to power converter 104, for example, during a startup of power generation system 100, and electrically disconnects solar array 102 from power converter 104, for example, during shutdown of system 100 and/or if an error or a fault occurs within electrical distribution network 106. As used herein, the terms "disconnect" and "decouple" are used interchangeably, and the terms "connect" and "couple" are used interchangeably. A DC filter 112 is coupled to converter conductor 108 for use in filtering an input voltage and/or current received from solar array 102.

In the exemplary embodiment, protection device 110 is a contactor that is controllably changed or "switched" between a first position 109 and a second position 111. First position 109 is a position or state in which protection device 110 electrically connects solar array 102 to power converter 104 to enable current to be received by power converter 104 from solar array 102. Second position 111 is a position or state in which protection device 110 electrically disconnects solar array 102 from power converter 104 to prevent current from being received from solar array 102, as described more fully herein.

In one embodiment, protection device 110 is a normally closed (NC) contactor that is normally positioned in first position 109, for example, during normal operation of power generation system 100. When a control signal is applied to protection device 110, device 110 opens to prevent current from flowing to power converter 104 from solar array 102. In an absence of a control signal, protection device 110 is closed to enable current to be received from solar array 102. Alternatively, protection device 110 is a normally open (NO) contactor that is normally positioned in second position 111. In some embodiments, the NO contactor is controlled by a control signal to be positioned in first position 109, for example, during normal operation of power generation system 100. Protection device 110 is not limited to only being a contactor, but may alternatively be a relay, a switch, a solid state device such as a silicon-controlled rectifier (SCR), and/or any other mechanical, electrical, or electromechanical switch that enables power generation system 100 to function as described herein. In some embodiments, such as embodiments wherein protection device 110 is a solid state device, first position 109 and second position 111 may not refer to physical locations of one or more portions of protection device 110, but may refer to different states of protection device 110 that perform the functions described herein.

Converter conductor 108, in the exemplary embodiment, is coupled to a first input conductor 114, a second input conductor 116, and a third input conductor 118 such that the input current is split between first, second, and third input conductors 114, 116, and 118. Alternatively, the input current may be conducted to a single conductor, such as converter conductor 108, and/or to any other number of conductors that enables power generation system 100 to function as described herein. At least one boost inductor 120 is coupled to each of first input conductor 114, second input conductor 116, and/or third input conductor 118. Boost inductors 120 facilitate filtering the input voltage and/or current received from solar array 102. In addition, at least a portion of the energy received from solar array 102 is temporarily stored within each boost inductor 120.

In the exemplary embodiment, a first input current sensor 122 is coupled to first input conductor 114, a second input current sensor 124 is coupled to second input conductor 116, and a third input current sensor 126 is coupled to third input conductor 118. First, second, and third input current sensors 122, 124, and 126 measure the current flowing through first, second, and third input conductors 114, 116, and 118, respectively.

In the exemplary embodiment, power converter 104 is a two-stage power converter that includes a DC to DC, or "boost," converter 128 as a first stage and an inverter 130 as a second stage. Boost converter 128 and inverter 130 are coupled together by a DC bus 132 (also referred to as a "DC link"). Boost converter 128, in the exemplary embodiment, is coupled to, and receives DC power from, solar array 102 through first, second, and third input conductors 114, 116, and 118. Moreover, boost converter 128 adjusts the voltage and/or current amplitude of the DC power received. In the exemplary embodiment, inverter 130 is a DC-AC inverter that converts DC power received from boost converter 128, through DC bus 132, into AC power for transmission to electrical distribution network 106. Moreover, in the exemplary embodiment, DC bus 132 includes at least one capacitor 134. Alternatively, DC bus 132 includes a plurality of capacitors 134 and/or any other electrical power storage devices that enable power converter 104 to function as described herein. As current is transmitted through power converter 104, a voltage is generated across DC bus 132 and energy is stored within capacitors 134. One or more DC bus voltage sensors 131 measure the voltage across DC bus 132 and generate signals indicative of the measured DC bus voltage.

A damping circuit 133 is coupled to DC bus 132 and is configured to selectively discharge or dissipate energy of DC bus 132 (e.g., energy stored within capacitor 134) to limit or reduce a magnitude of the voltage across DC bus 132. Damping circuit 133 includes protection device 110 and at least one damping element 135 coupled to protection device 110. In the exemplary embodiment, damping element 135 is a resistor that dissipates energy when current flows through the resistor. Additionally or alternatively, damping element 135 may include capacitive and/or inductive elements to dissipate energy when current flows through element 135.

Boost converter 128, in the exemplary embodiment, includes two converter switches 136 coupled together in serial arrangement for each phase of electrical power that power converter 104 produces. In the exemplary embodiment, converter switches 136 are insulated gate bipolar transistors (IGBTs). Alternatively, converter switches 136 are any other suitable transistor or any other suitable switching device. Moreover, each pair of converter switches 136 for each phase is coupled in parallel with each pair of converter switches 136 for each other phase. As such, for a three phase power converter 104, boost converter 128 includes a first converter switch 138 coupled in series with a second converter switch 140, a third converter switch 142 coupled in series with a fourth converter switch 144, and a fifth converter switch 146 coupled in series with a sixth converter switch 148. First and second converter switches 138 and 140 are coupled in parallel with third and fourth converter switches 142 and 144, and with fifth and sixth converter switches 146 and 148. Alternatively, boost converter 128 may include any suitable number of converter switches 136 arranged in any suitable configuration.

Inverter 130, in the exemplary embodiment, includes two inverter switches 150 coupled together in serial arrangement for each phase of electrical power that power converter 104 produces. In the exemplary embodiment, inverter switches 150 are insulated gate bipolar transistors (IGBTs). Alternatively, inverter switches 150 are any other suitable transistor or any other suitable switching device. Moreover, each pair of inverter switches 150 for each phase is coupled in parallel with each pair of inverter switches 150 for each other phase. As such, for a three phase power converter 104, inverter 130 includes a first inverter switch 152 coupled in series with a second inverter switch 154, a third inverter switch 156 coupled in series with a fourth inverter switch 158, and a fifth inverter switch 160 coupled in series with a sixth inverter switch 162. First and second inverter switches 152 and 154 are coupled in parallel with third and fourth inverter switches 156 and 158, and with fifth and sixth inverter switches 160 and 162. Alternatively, inverter 130 may include any suitable number of inverter switches 150 arranged in any suitable configuration.

Power converter 104 includes a control system 164 that includes a converter controller 166, a damping controller 167, and an inverter controller 168. Converter controller 166 is coupled to, and controls an operation of, boost converter 128. More specifically, in the exemplary embodiment, converter controller 166 operates boost converter 128 to maximize the power received from solar array 102. Damping controller 167 is coupled to, and controls an operation of, damping circuit 133. More specifically, in the exemplary embodiment, damping controller 167 selectively operates protection device 110 to channel current through damping element 135 to dissipate at least a portion of the energy in DC bus 132. Inverter controller 168 is coupled to, and controls the operation of, inverter 130. More specifically, in the exemplary embodiment, inverter controller 168 operates inverter 130 to regulate the voltage across DC bus 132 and/or to adjust the voltage, current, phase, frequency, and/or any other characteristic of the power output from inverter 130 to substantially match the characteristics of electrical distribution network 106.

In the exemplary embodiment control system 164, converter controller 166, damping controller 167, and/or inverter controller 168 include and/or are implemented by at least one processor. As used herein, the processor includes any suitable programmable circuit such as, without limitation, one or more systems and microcontrollers, microprocessors, reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor." In addition, control system 164, converter controller 166, damping controller 167, and/or inverter controller 168 include at least one memory device (not shown) that stores computer-executable instructions and data, such as operating data, parameters, setpoints, threshold values, and/or any other data that enables control system 164 to function as described herein.

Converter controller 166, in the exemplary embodiment, receives current measurements from first input current sensor 122, second input current sensor 124, and/or third input current sensor 126. Moreover, converter controller 166 receives measurements of a voltage of first input conductor 114, second input conductor 116, and/or third input conductor 118 from a plurality of input voltage sensors (not shown). Inverter controller 168, in the exemplary embodiment, receives current measurements from a first output current sensor 170, a second output current sensor 172, and/or a third output current sensor 174. Moreover, inverter controller 168 receives measurements of a voltage output from inverter 130 from a plurality of output voltage sensors (not shown). In the exemplary embodiment, converter controller 166, damping controller 167, and/or inverter controller 168 receive voltage measurements of the voltage of DC bus 132 from a DC bus voltage sensor (not shown).

Damping controller 167 and damping circuit 133 form a damping system 175 of power converter 104. In the exemplary embodiment, damping controller 167 transmits a control signal to protection device 110 to control the operation of device 110. For example, the control signal causes protection device 110 to switch between first position 109 and second position 111 to receive current (and power) from solar array 102 and to channel current through damping element 135 to dissipate energy of DC bus 132. In addition, damping controller 167 receives signals indicative of the power output of inverter 130 from inverter controller 168, from output current sensors 170, 172, and 174, and/or from a plurality of output voltage sensors (not shown). Damping controller 167 also receives signals indicative of the voltage across DC bus 132 from DC bus voltage sensor 131. In some embodiments, damping controller 167 monitors the condition or status of electrical distribution network 106, such as via sensors (not shown) coupled to electrical distribution network 106 to monitor the voltage and the current of network 106. Damping controller 167 controls protection device 110 based on the condition or a status of electrical distribution network 106 and/or based on a condition or a status of DC bus 132.

In the exemplary embodiment, inverter 130 is coupled to electrical distribution network 106 by a first output conductor 176, a second output conductor 178, and a third output conductor 180. Moreover, in the exemplary embodiment, inverter 130 provides a first phase of AC power to electrical distribution network 106 through first output conductor 176, a second phase of AC power to electrical distribution network 106 through second output conductor 178, and a third phase of AC power to electrical distribution network 106 through third output conductor 180. First output current sensor 170 is coupled to first output conductor 176 for measuring the current flowing through first output conductor 176. Second output current sensor 172 is coupled to second output conductor 178 for measuring the current flowing through second output conductor 178, and third output current sensor 174 is coupled to third output conductor 180 for measuring the current flowing through third output conductor 180.

At least one inductor 182 is coupled to each of first output conductor 176, second output conductor 178, and/or third output conductor 180. Inductors 182 facilitate filtering the output voltage and/or current received from inverter 130. Moreover, in the exemplary embodiment, an AC filter 184 is coupled to first output conductor 176, second output conductor 178, and/or third output conductor 180 for use in filtering an output voltage and/or current received from conductors 176, 178, and 180.

In the exemplary embodiment, at least one contactor 186 and/or at least one disconnect switch 188 are coupled to first output conductor 176, second output conductor 178, and/or third output conductor 180. Contactors 186 and disconnect switches 188 electrically disconnect inverter 130 from electrical distribution network 106, for example, if an error or a fault occurs within power generation system 100. Moreover, in the exemplary embodiment, protection device 110, contactors 186 and disconnect switches 188 are controlled by control system 164. Alternatively, protection device 110, contactors 186 and/or disconnect switches 188 are controlled by any other system that enables power converter 104 to function as described herein.

Power converter 104 also includes a bus charger 190 that is coupled to first output conductor 176, second output conductor 178, third output conductor 180, and to DC bus 132. In the exemplary embodiment, at least one charger contactor 192 is coupled to bus charger 190 for use in electrically disconnecting bus charger 190 from first output conductor 176, second output conductor 178, and/or third output conductor 180. Moreover, in the exemplary embodiment, bus charger 190 and/or charger contactors 192 are controlled by control system 164 for use in charging DC bus 132 to a predetermined voltage.

During operation, in the exemplary embodiment, solar array 102 generates DC power and transmits the DC power to boost converter 128. Converter controller 166 controls a switching of converter switches 136 to adjust an output of boost converter 128. More specifically, in the exemplary embodiment, converter controller 166 controls the switching of converter switches 136 to adjust the voltage and/or current received from solar array 102 such that the power received from solar array 102 is increased and/or maximized.

Inverter controller 168, in the exemplary embodiment, controls a switching of inverter switches 150 to adjust an output of inverter 130. More specifically, in the exemplary embodiment, inverter controller 168 uses a suitable control algorithm, such as pulse width modulation (PWM) and/or any other control algorithm, to transform the DC power received from boost converter 128 into three phase AC power signals. Alternatively, inverter controller 168 causes inverter 130 to transform the DC power into a single phase AC power signal or any other signal that enables power converter 104 to function as described herein.

In the exemplary embodiment, each phase of the AC power is filtered by AC filter 184, and the filtered three phase AC power is transmitted to electrical distribution network 106. In the exemplary embodiment, three phase AC power is also transmitted from electrical distribution network 106 to DC bus 132 by bus charger 190. In one embodiment, bus charger 190 uses the AC power to charge DC bus 132 to a suitable voltage amplitude, for example, during a startup and/or a shutdown sequence of power converter 104.

Control system 164 monitors the voltage across DC bus 132 and monitors the status of electrical distribution network 106. For example, control system 164 determines, or receives messages indicative of, the status of electrical distribution network 106, such as whether a fault has occurred within network 106. The fault may include a low voltage ride-through (LVRT) event, zero voltage ride-through (ZVRT) event, high voltage ride-through (HVRT) event, a phase jump event, a single phase open event, and/or any other fault or error. If control system 164 determines that a predetermined condition is met, damping system 175 operates damping circuit 133 to control the voltage across DC bus 132, such as by dissipating energy from bus 132. In the exemplary embodiment, the predetermined condition is met when control system 164 determines that a fault has occurred within electrical distribution network 106 and/or that the voltage across DC bus 132 exceeds a predetermined threshold (hereinafter referred to as an "overvoltage event") or is likely to exceed the predetermined threshold.

Specifically, if the predetermined condition is met, damping controller 167 transmits a control signal to protection device 110 to switch device 110 from first position 109 to second position 111. When protection device 110 is switched to second position 111, solar array 102 is electrically disconnected from power converter 104, and damping element 135 is electrically connected to power converter 104 (i.e., to converter conductor 108). Accordingly, current is prevented from being received from solar array 102, and current is transmitted from DC bus 132, through damping element 135, and back through converter conductor 108. The current enters boost converter 128 and is transmitted to DC bus 132 through converter switches 136 (e.g., through second converter switch 140, fourth converter switch 144, and sixth converter switch 148). Accordingly, when protection device 110 is switched to second position 111, a dissipation loop is created from DC bus 132 through damping element 135, inductors 120, converter switches 136, and back to DC bus 132. The current flowing through damping element 135 causes energy to be dissipated, thus reducing or limiting the energy within DC bus 132.

In one embodiment, not all converter switches 136 are used to convert and/or adjust the power received from solar array 102 during normal operation. For example, a PWM control algorithm may use only second converter switch 140, fourth converter switch 144, and sixth converter switch 148. First converter switch 138, third converter switch 142, and fifth converter switch 146 may therefore remain substantially idle during normal operation and while dissipating energy from DC bus 132. In such an embodiment, first converter switch 138, third converter switch 142, and fifth converter switch 146 may be omitted and each switch 138, 142, and 146 may be replaced by a diode, for example.

When the predetermined condition is determined to not be met, for example, if the fault in electrical distribution network 106 is resolved or if the overvoltage event of DC bus 132 is resolved, damping controller 167 switches protection device 110 from second position 111 to first position 109. Accordingly, damping element 135 is electrically disconnected from power converter 104 such that current is prevented from flowing through element 135, and solar array 102 is electrically connected to power converter 104 such that current is enabled to be received by converter 104 from array 102. It should be recognized that first position 109 and second position 111 are mutually exclusive in the exemplary embodiment. Accordingly, current is enabled to be received from solar array 102 when current is prevented from flowing through damping element 135. In a similar manner, current is prevented from being received from solar array 102 when current is enabled to flow through damping element 135.

In addition, during a shutdown event of power converter 104, damping controller 167 switches protection device 110 from first position 109 to second position 111 to electrically disconnect solar array 102 from power converter 104. The energy of DC bus 132 is dissipated through damping element 135 as described above. Accordingly, power generation system 100 may dissipate the energy from DC bus 132 during a shutdown event more quickly than prior art systems that do not include damping system 175, thus enabling the shutdown event to be completed more quickly than the prior art systems. As used herein, the term "shutdown event" refers to an event in which a command signal is received from control system 164 and/or another system or device to disable power converter 104 in preparation for electrically decoupling solar array 102 from electrical distribution network 106.

Figure 2:
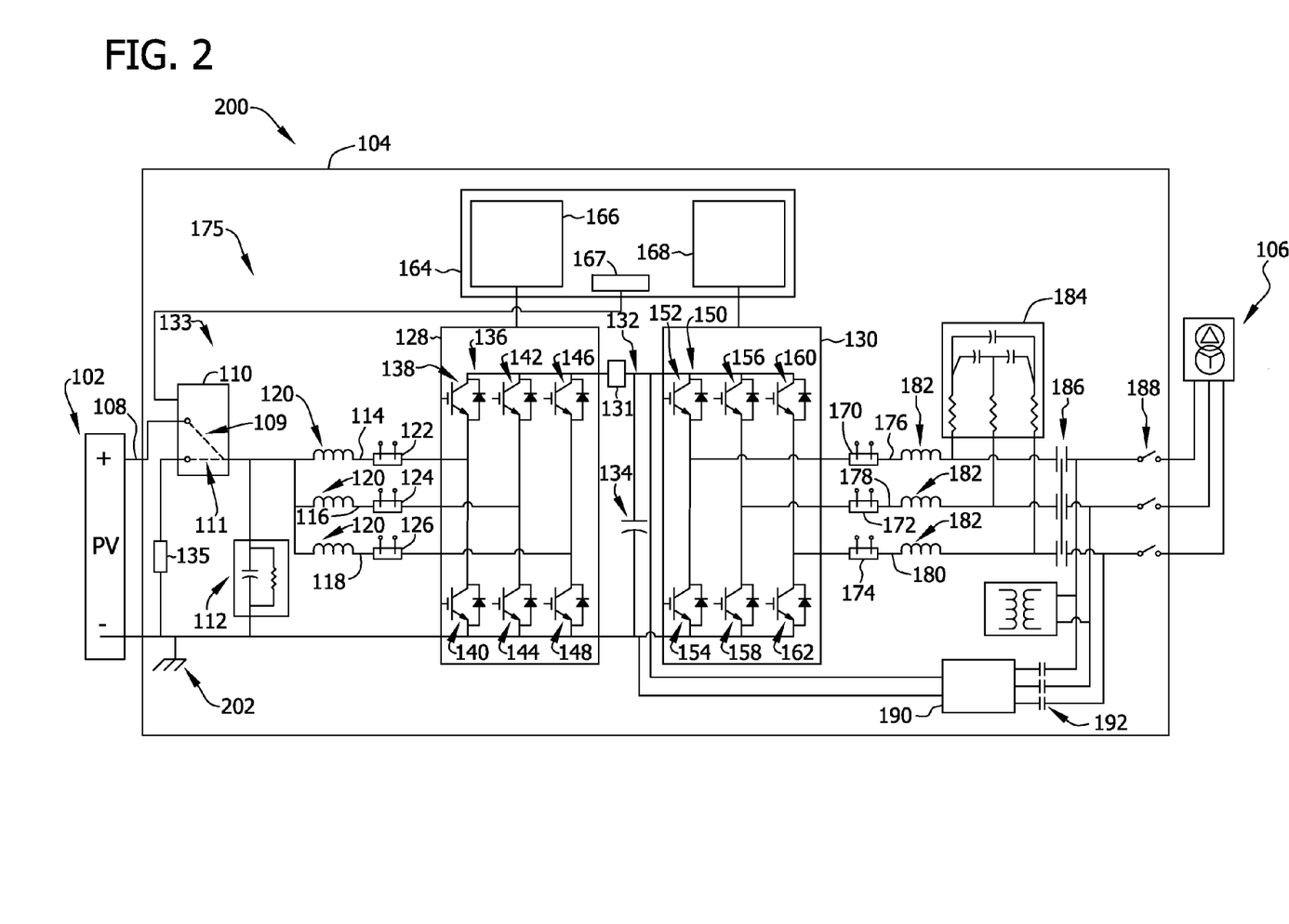
FIG. 2 is a schematic diagram of another exemplary power generation system.

FIG. 2 is a schematic diagram of another exemplary power generation system 200. Unless otherwise specified, power generation system 200 is similar to power generation system 100 (shown in FIG. 1), and similar components are labeled in FIG. 2 with the same reference numerals used in FIG. 1.

In the exemplary embodiment, damping element 135 is coupled between a ground connection 202 of power converter 104 and converter conductor 108 through protection device 110. Accordingly, when protection device 110 is switched to second position 111, current flows from DC bus 132 through converter switches 136 (i.e., through first converter switch 138, third converter switch 142, and fifth converter switch 146), converter conductor 108, damping element 135, and back to DC bus 132 through ground connection 202.

During normal operation (i.e., when protection device 110 is in first position 109), a PWM control algorithm may use second converter switch 140, fourth converter switch 144, and sixth converter switch 148 to convert and/or adjust power received from solar array 102. Accordingly, in contrast to power generation system 100, each converter switch 136 is used during normal operation and to dissipate energy from DC bus 132 of power generation system 200. In other respects, power generation system 200 and damping system 175 operate in a similar manner as described above with reference to FIG. 1.

Figure 3:
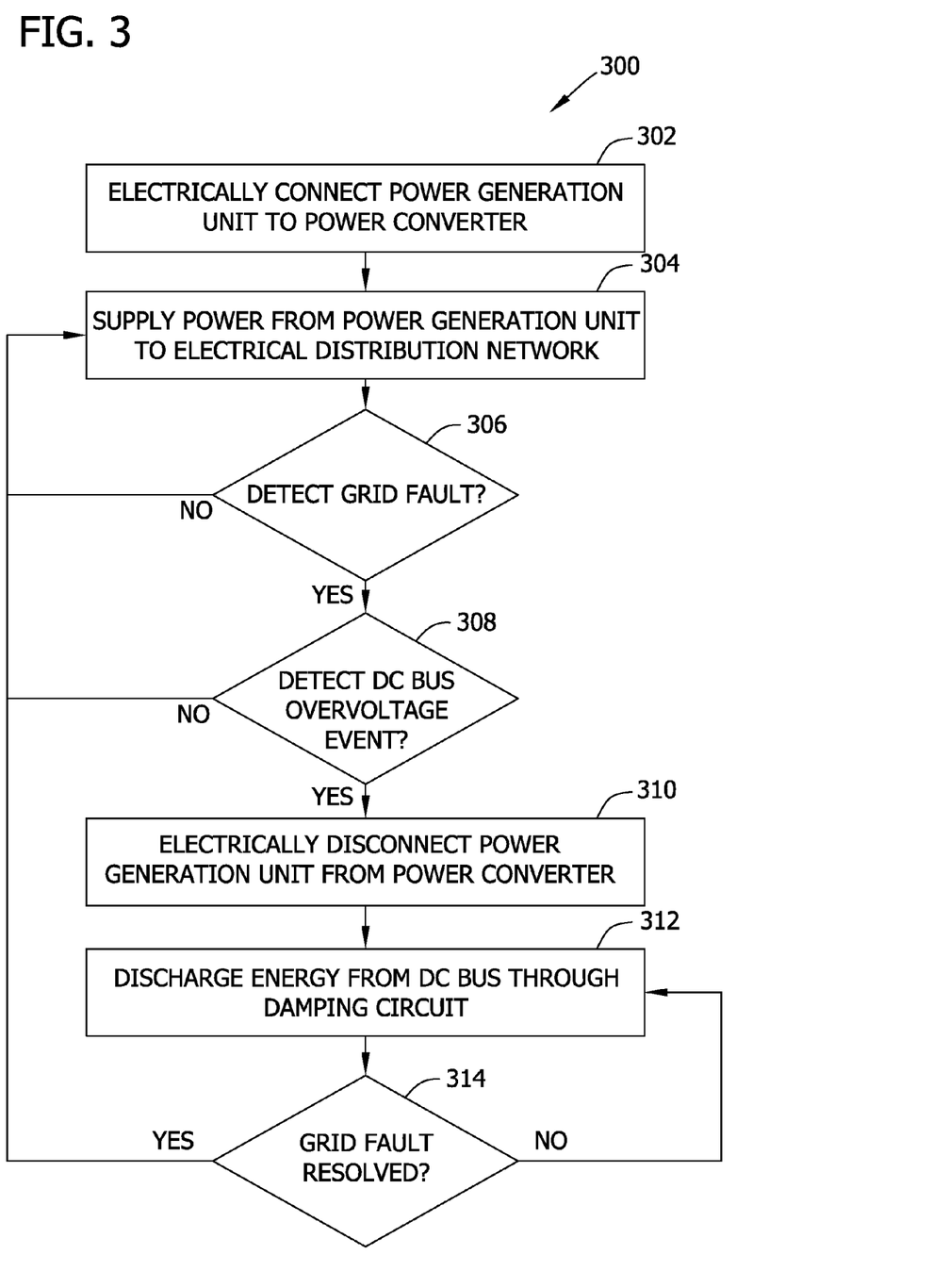
FIG. 3 is a flow diagram of an exemplary method of operating a power converter that may be used with the power generation systems shown in FIGS. 1 and 2.

FIG. 3 is a flow diagram of an exemplary method 300 of operating a power converter, such as power converter 104 (shown in FIG. 1). Method 300 may be used with power generation system 100 (shown in FIG. 1) and/or power generation system 200 (shown in FIG. 2). In the exemplary embodiment, method 300 is implemented by control system 164, such as by converter controller 166, damping controller 167, and/or inverter controller 168 (all shown in FIG. 1). Alternatively, method 300 may be implemented by any other system or device that enables power converter 104 to function as described herein.

In the exemplary embodiment, one or more power generation units 102, such as solar arrays 102 (shown in FIG. 1), are electrically connected 302 to power converter 104. For example, damping controller 167 switches protection device 110 from second position 111 to first position 109 (all shown in FIG. 1) to electrically connect 302 power generation unit 102 to power converter 104. Power is supplied 304 from power generation unit 102 to electrical distribution network 106 (shown in FIG. 1) through power converter 104 as converter 104 commences normal operation.

Control system 164 monitors the status of an electrical grid, such as electrical distribution network 106, to detect 306 a fault therein, or to determine whether a fault has occurred therein. If control system 164 does not detect 306 a fault within electrical distribution network 106 or determines that a fault has not occurred, power continues to be supplied 304 from power generation unit 102 to electrical distribution network 106. However, if control system 164 detects 306 a fault within electrical distribution network 106 or determines that a fault has occurred, control system 164 monitors the voltage across DC bus 132 to determine or detect 308 whether an overvoltage event has occurred within DC bus 132, or whether an overvoltage event is likely to occur.

If control system 164 determines 308 that an overvoltage event has not occurred within DC bus 132 or is not likely to occur, power continues to be supplied 304 from power generation unit 102 to electrical distribution network 106. However, if control system 164 determines that an overvoltage event has occurred within DC bus 132 or is likely to occur, power generation unit 102 is electrically disconnected 310 from power converter 104 such that current is not received from power generation unit 102. For example, damping controller 167 switches protection device 110 from first position 109 to second position 111 to electrically disconnect 310 power generation unit 102 from power converter 104.

Energy from DC bus 132 is discharged or dissipated 312, for example, using damping circuit 133 (shown in FIG. 1). More specifically, when protection device 110 is switched to second position 111, current is enabled to flow through one or more damping elements 135 (shown in FIG. 1) from DC bus 132. The current flowing through damping elements 135 causes at least a portion of the energy within DC bus 132 to be discharged or dissipated. Accordingly, the overvoltage event is facilitated to be shortened and/or avoided.

If control system 164 determines 314 that the grid fault is resolved and/or that the overvoltage event is resolved, damping controller 167 switches protection device 110 from second position 111 to first position 109 to enable power to be supplied 304 to electrical distribution network 106 from power generation unit 102. If the grid fault and/or the overvoltage event is determined 314 to not be resolved, energy from DC bus 132 continues to be discharged or dissipated 312 using damping circuit 133.

In an alternative embodiment, the step of detecting 306 a grid fault is not performed, and method 300 determines or detects 308 whether an overvoltage event has occurred or is likely to occur within DC bus 132 after power is supplied 304 to power converter 104. In other respects, method 300 operates in a similar manner as described above.

In another embodiment, the step of detecting or determining 308 whether an overvoltage event has occurred or is likely to occur within DC bus 132 is not performed, and method 300 disconnects 310 power generation unit 102 from power converter 104 if a grid fault is detected 306. In other respects method 300 operates in a similar manner as described above.

A technical effect of the systems and methods described herein includes at least one of: (a) receiving current from a power generation unit; (b) storing energy within a bus based on a current received; (c) supplying at least a portion of a received current to an electrical distribution network; (d) monitoring at least one of a voltage across a bus and a status of an electrical distribution network; (e) determining whether a predetermined condition is met based on at least one of a voltage across a bus and a status of an electrical distribution network; and (f) discharging at least a portion of an energy stored within a bus using a damping circuit coupled to the bus when a predetermined condition is determined to be met.

Exemplary embodiments of a power converter system, a damping system, and a method of operating a power converter system are described above in detail. The power converter system, damping system, and method are not limited to the specific embodiments described herein, but rather, components of the power converter system and/or damping system, and/or steps of the method may be utilized independently and separately from other components and/or steps described herein. For example, the damping system may also be used in combination with other power generation systems and methods, and is not limited to practice with only the power generation system as described herein. Rather, the exemplary embodiment can be implemented and utilized in connection with many other renewable energy and/or power generation applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power converter system comprising:
   a converter configured to be coupled to a power generation unit for receiving current from the power generation unit;
   a bus coupled to said converter, wherein energy is stored within said bus when the current is conducted through said power converter system;
   a damping circuit configured to selectively switch coupling thereof between said bus and the power generation unit, wherein said damping circuit comprises a damping element configured to dissipate energy; and,
   a control system coupled to said converter and to said damping circuit, said control system configured to selectively discharge at least a portion of the energy stored within said bus through said damping circuit when said control system determines that a predetermined condition is met.

2. A power converter system in accordance with claim 1, wherein said control system determines that the predetermined condition is met when at least one of a voltage across said bus exceeds a predetermined threshold and the voltage across said bus is expected to exceed the predetermined threshold.

3. A power converter system in accordance with claim 1, wherein said damping element comprises one or more of a resistor, a capacitive element, and an inductive element.

4. A power converter system in accordance with claim 3, wherein said damping circuit further comprises a protection device configured to enable current to be received from the power generation unit when current is prevented from flowing through said damping element.

5. A power converter system in accordance with claim 3, wherein said damping circuit further comprises a protection device configured to prevent current from being received from the power generation unit when current is enabled to flow through said damping element.

6. A power converter system in accordance with claim 3, wherein said control system is configured to prevent current from flowing through said damping element when the predetermined condition is not met.

7. A power converter system in accordance with claim 3, wherein said control system is configured to channel current through said damping element when the predetermined condition is met.

8. A power converter system in accordance with claim 1, wherein said converter comprises at least one first phase converter switch configured to provide a first phase of power and at least one second phase converter switch configured to provide a second phase of power.

9. A damping system for a power converter system configured to convert power generated by a power generation unit, the power converter system including a converter and a bus coupled to the converter for storing energy, said damping system comprising:
   a damping element configured to be coupled to the bus;
   a protection device configured to selectively switch coupling of the bus between said damping element and the power generation unit; and,
   a damping controller configured to be coupled to said protection device and configured to selectively discharge energy stored within the bus through said damping element when a predetermined condition is met.

10. A damping system in accordance with claim 9, wherein said damping element comprises one or more of a resistor, a capacitive element, and an inductive element configured to be coupled to the bus.

11. A damping system in accordance with claim 9, wherein said protection device is further configured to enable current to be received from the power generation unit when current is prevented from flowing through said damping element.

12. A damping system in accordance with claim 9, wherein said protection device is further configured to prevent current from being received from the power generation unit when current is enabled to flow through said damping element.

13. A damping system in accordance with claim 9, wherein said damping controller is configured to prevent current from flowing through said damping element when the predetermined condition is not met.

14. A damping system in accordance with claim 9, wherein said damping controller is configured to channel current through said damping element when the predetermined condition is met.

15. A method of operating a power converter system including a converter and a bus coupled to the converter, said method comprising:
   receiving current from a power generation unit;
   storing energy within the bus based on the current received;
   supplying at least a portion of the current received to an electrical distribution network;
   monitoring at least one of a voltage across the bus and a status of the electrical distribution network;
   determining whether a predetermined condition is met based on the at least one of the voltage across the bus and the status of the electrical distribution network;
   selectively switching coupling of the bus between the power generation unit and a damping circuit when the predetermined condition is determined to be met, wherein the damping circuit includes a damping element configured to discharge energy; and,
   discharging at least a portion of the energy stored within the bus using the damping circuit coupled to the bus.

16. A method in accordance with claim 15, further comprising determining that the predetermined condition is met when at least one of a voltage across the bus exceeds a predetermined threshold and the voltage across the bus is expected to exceed the predetermined threshold.

17. A method in accordance with claim 15, wherein the damping element includes one or more of a resistor, a capacitive element, and an inductive element, said method further comprising enabling current to be received from the power generation unit when current is prevented from flowing through the damping element.

18. A method in accordance with claim 17, further comprising preventing current from being received from the power generation unit when current is enabled to flow through the damping element.

19. A method in accordance with claim 15, wherein the damping circuit includes a resistor coupled to the bus, said method further comprising preventing current from flowing through the damping element when the predetermined condition is not met.

20. A method in accordance with claim 19, further comprising channeling current through the damping element when the predetermined condition is met.

* * * * *